United States Patent
Nagata

(10) Patent No.: US 7,006,148 B2
(45) Date of Patent: Feb. 28, 2006

(54) SCAN LINE CONVERSION CIRCUIT FOR SIMULTANEOUSLY CARRYING OUT THREE-DIMENSIONAL MOTION ADAPTIVE SEQUENTIAL SCAN CONVERSION AND SCAN LINE CONVERSION

(75) Inventor: Hiroshi Nagata, Minato-ku (JP)

(73) Assignee: NEC Corporation, Tokyo (JP)

( * ) Notice: Subject to any disclaimer, the term of this patent is extended or adjusted under 35 U.S.C. 154(b) by 447 days.

(21) Appl. No.: 10/179,216

(22) Filed: Jun. 26, 2002

(65) Prior Publication Data

US 2003/0007091 A1    Jan. 9, 2003

(30) Foreign Application Priority Data

Jun. 27, 2001   (JP)   .............................. 2001-195585

(51) Int. Cl.
   *H04N 11/20*   (2006.01)

(52) U.S. Cl. ........................ 348/448; 348/458; 348/452
(58) Field of Classification Search ................ 348/448, 348/452, 450, 458, 790, 797; 345/42, 94, 345/98, 664, 665
See application file for complete search history.

(56) References Cited

U.S. PATENT DOCUMENTS

| | | | |
|---|---|---|---|
| 5,475,437 A | * | 12/1995 | Song .......................... 348/448 |
| 5,793,435 A | * | 8/1998 | Ward et al. ................. 348/448 |
| 6,380,978 B1 | * | 4/2002 | Adams et al. .............. 348/452 |

FOREIGN PATENT DOCUMENTS

JP    2000-253365 A    9/2000

* cited by examiner

*Primary Examiner*—Victor R. Kostak
(74) *Attorney, Agent, or Firm*—Sughrue Mion, PLLC

(57) ABSTRACT

A scan line conversion circuit is provided for simultaneously carrying out three-dimensional motion adaptive sequential scan conversion and scan line conversion. The scan line conversion circuit comprises an FIFO memory into which the video signal is input; a sequential scan conversion circuit section for converting an interlace signal sent from the FIFO memory to a non-interlace signal; an address generator into which a vertical enlargement ratio and a synchronous signal are input to generate an address as a spatial position after scan line conversion; a memory control unit for generating a memory control signal based on the address sent from the address generator; a coefficient generator for generating a coefficient for performing scan line conversion; a plurality of first multipliers for multiplying sequentially scan converted signals, sent from the sequential scan conversion circuit section, by respective coefficients; and an adder for adding signals output from the multipliers together.

6 Claims, 8 Drawing Sheets

P: IMAGE DATA
u: HORIZONTAL COORDINATE
v: VERTICAL COORDINATE $a_n, b_n, c_n, d_n, a_{n+1}, b_{n+1}, c_{n+1}, d_{n+1}, a_{n+2}, b_{n+2}, c_{n+2}, d_{n+2},$
$a_{n+3}, b_{n+3}, c_{n+3}, d_{n+3}$ : INPUT PIXEL VALUE
$a_m, b_m, c_m, d_m$ : OUTPUT PIXEL VALUE
x : DISTANCE BETWEEN LINEn+1 AND LINEm

SCAN LINE CONVERSION CIRCUIT FOR SIMULTANEOUSLY CARRYING OUT THREE-DIMENSIONAL MOTION ADAPTIVE SEQUENTIAL SCAN CONVERSION AND SCAN LINE CONVERSION

FIELD OF THE INVENTION

The invention relates to a scan line conversion circuit which is used, in display devices such as liquid crystal displays or plasma displays, for converting input video signals to the number of scan lines in the display device.

BACKGROUND OF THE INVENTION

A scan line conversion circuit is used, particularly in display devices such as liquid crystal displays or plasma displays, for converting input video signals to the number of scan lines in the display device.

In the scan line conversion circuit, in general, when an interlace signal has been input, the number of scan lines is converted by a method wherein, independently of whether the input signal is a static image or a moving image, the scan line is interpolated within the field and, in addition, is converted to a non-interlace signal, or by a method wherein, after conversion to a non-interlace signal by three-dimensional motion adaptive scan line interpolation is once performed, the number of scan lines is converted by resolution conversion processing (Japanese Patent Laid-Open No. 253365/2000).

FIG. 1 is a block diagram showing the construction of a conventional system, FIG. 2 a circuit diagram showing a conventional three-dimensional motion adaptive sequential scan conversion circuit, and FIG. 3 a circuit diagram showing a conventional scan line conversion circuit. As shown in FIG. 1, a video signal is input through an input terminal 301 into a three-dimensional motion adaptive sequential scan conversion circuit 302, is converted to a non-interlace signal by three-dimensional motion adaptive sequential scan conversion, and is then input into a resolution conversion circuit 304 where the interlace signal is converted to the resolution of the display device. Thus, when the three-dimensional motion adaptive sequential scan conversion is used in combination with the resolution conversion, after the three-dimensional motion adaptive sequential scan conversion is performed as shown in FIG. 2, the resolution conversion is performed as shown in FIG. 3. In this case, as shown in FIG. 1, SDRAM 303 for sequential scan conversion should be provided separately from SDRAM 305 for resolution conversion.

In the conventional three-dimensional motion adaptive sequential scan conversion circuit 302 shown in FIG. 2, the interlace signal input into the signal terminal 1 is supplied to a field memory 3, a motion detector 6, and an adder 5. Further, the output of the field memory 3 is input into a next-stage field memory 4.

The signal output from the field memory 4 is input into the adder 5 and is further input into a multiplier 12 for multiplying the signal, output from the adder 5, by ½. In the adder 5 and the multiplier 12, a signal not sent to the current field due to the interlace signal is generated from a signal of one field before the contemplated signal and a signal of one field after the contemplated signal, and interpolation processing, in the case where the input signal is a static image, is performed.

The signal output from the field memory 3 is sent to a 1H delay memory 8, an adder 10, and a multiplier 13, for one-line delaying. The signal output from the 1H delay memory 8 is sent to the adder 10. Further, the output of the adder 10 is sent to a multiplier 13 for multiplying the output signal by ½.

In the adder 10, in the input interlace signal, the upper scan line is added to the lower scan line. Therefore, a signal not to sent to the current field is generated from the upper and lower scan lines, and interpolation processing, in the case where the input signal is a moving image, is performed.

On the other hand, in the motion detector 6, the signal from the input terminal 1 and a signal, which has been delayed by two fields by the field memories 3, 4, that is, a one-frame-before signal, are input, and the motion level is detected by determining the difference between these signals. In the motion detector 6, processing is performed to transform the motion quantity into a coefficient from the motion level. The coefficient output from the motion detector 6 is sent to multipliers 19, 20 where the mixing ratio of the signal, which has been interpolated for the static image, to the signal, which has been interpolated for the moving image, is adaptively varied according to the motion quantity of the input signal.

The output of the multipliers 19 is added to the output of the multiplier 20 in an adder 21, followed by sending from the adder 21 to a line memory 102. Further, the output of the field memory 3 is input into a line memory 101. An output is selected by a switch 103 from the output of the line memory 101 and the output of the line memory 102, and the selected output is sent to a scan line conversion circuit 304.

The conventional scan line conversion circuit 304 shown in FIG. 3 comprises: an FIFO (first in first out) memory 207 for scan line conversion; an address generator 205 for generating an address; a memory control unit 202 for controlling the memory; a coefficient generator 206 for generating a coefficient from a signal obtained from the address generator 205; multipliers 211 to 214 for successively multiplying signals, produced by the scan conversion processing, by the coefficient; and an adder 215 for adding the outputs of the multipliers 211 to 214 together. The signal output from the FIFO memory 207 is sent to a 1H delay memory 208 for one-line delaying and a multiplier 214. The signal output from the 1H delay memory 208 is sent to a 1H delay memory 209 and an adder 213 which have been provided in tandem. The signal output from the 1H delay memory 209 is sent to a 1H delay memory 210 and an adder 212. The signal output from the 1H delay memory 210 is sent to the adder 211.

In the address generator 205, a spatial position after scan line interpolation necessary for scan line conversion, that is, an address, is generated from a synchronous signal of the signal input into a terminal 204 and an enlargement ratio, which is input into a terminal 203 and sets the enlargement ratio in the vertical direction. Based on the address output from the address generator 205, the memory control unit 202 decides a line to be used for resolution conversion. That is, the memory control unit 202 generates a memory control signal for the read/write control of the FIFO memory 207 and the one-line delay memories 208, 209, 210 so as to send line data necessary for resolution conversion to the multipliers 211 to 214 provided in the final stage. Further, in the coefficient generator 206, a coefficient to be sent to the multipliers 211 to 214 is generated based on the signal output from the address generator 205.

Signals equivalent to sequentially scan converted signals are input into the multipliers 211 to 214, and, in the multipliers 211 to 214, the signals are multiplied by the coefficient sent from the coefficient generator 206, and the obtained values are added together in the adder 215, whereby scan line conversion can be performed.

Japanese Patent Laid-Open No. 253365/2000 further proposes a scan line conversion circuit comprising conventional three-dimensional scan line interpolation circuit and resolution conversion circuit.

Resolution conversion circuits are classified into two types. In one type, a frame memory using DRAM is provided. In the other type, no frame memory is provided, and a line memory for several lines is provided within LSI. The provision of the frame memory is advantageous in that the conversion of a field frequency can be carried out or in that partial enlargement or reduction is possible.

Further, at the present time, in many cases, three-dimensional motion adaptive sequential scan conversion is not carried out, and, instead, at the time of resolution conversion processing in the vertical direction, offsetting the initial value for each field serves also as sequential scan conversion. In this case, however, the interlace signal is subjected to intra-field interpolation for sequential scan conversion. Also in the static image, line flicker occurs. Accordingly, the adoption of a method, wherein, in order to prevent the line flicker, resolution conversion is performed after three-dimensional motion adaptive sequential scan conversion, would be led to improved image quality.

When scan line interpolation is performed only within the field, the circuit scale may be small. In this case, however, the line flicker disadvantageously occurs also in the static image. On the other hand, conversion to an interlace signal by three-dimensional motion adaptive scan line interpolation followed by scan line interpolation by resolution conversion poses problems such as large circuit scale, high cost, and required large mounting area.

Further, as shown in FIG. 1, SDRAM 303 for sequential scan conversion should be provided separately from SDRAM 305 for resolution conversion. This poses a problem of the necessity of increasing the number of external SDRAMs. Furthermore, when the scan line conversion circuit disclosed in Japanese Patent Laid-Open No. 253365/2000 has a frame memory, the frame memory should be provided in the three-dimensional scan line interpolation and the resolution conversion circuit. As with the conventional technique, disadvantageously, the number of external SDRAMs should be increased.

Further, in the conventional circuit, when an HDTV signal is input into a display device wherein the number of scan lines is, for example, 768, a method should be used wherein, after a digital HDTV signal input at a clock rate of 74.25 MHz is converted by three-dimensional motion adaptive sequential scan conversion to a signal of the number of scan lines 1080 and clock rate 148.5 MHz, the number of scan lines is converted to 768. In this case, in the course of signal processing, operation should be performed at a higher frequency than the clock rate required for resolution in the display device.

Further, in recent years, an increase in size of liquid crystal displays or the development of large-screen plasma displays has led to a trend toward the practical use of large-screen televisions. In these large-screen televisions, there is a strong demand for an improvement in image quality in the case of the input of interlace signals, and, in addition, a reduction in cost is indispensable. Therefore, the development of a scan line conversion circuit satisfying these demands has been desired in the art.

SUMMARY OF THE INVENTION

In view of the above problems of the present invention, the present invention has been made, and it is an object of the invention to provide a high-quality, low-cost scan line conversion circuit wherein circuits and memories are rendered common to three-dimensional motion adaptive sequential scan conversion and scan line conversion (resolution conversion) to simultaneously perform the three-dimensional motion adaptive sequential scan conversion and the scan line conversion (resolution conversion).

According to the first feature of the invention, a scan line conversion circuit for converting the number of scan lines of an input video signal comprises: an FIFO (first in first out) memory into which the video signal is input; a sequential scan conversion circuit section for converting an interlace signal sent from the FIFO memory to a non-interlace signal; an address generator into which a vertical enlargement ratio and a synchronous signal are input to generate an address as a spatial position after scan line conversion; a memory control unit for generating a memory control signal based on the address sent from the address generator; a coefficient generator for generating a coefficient for performing scan line conversion; a plurality of first multipliers for multiplying sequentially scan converted signals, sent from the sequential scan conversion circuit section, by respective coefficients; and an adder for adding signals output from the multipliers together.

In this scan line conversion circuit, a construction may be adopted wherein the memory control unit controls memories including the FIFO memory and the field memory in the sequential scan conversion circuit section and inputs line data necessary for resolution conversion into the multipliers.

Further, in the scan line conversion circuit, a construction may be adopted wherein the sequential scan conversion circuit section comprises: a two-stage field memory to which an interlace signal is sent from the FIFO memory; a motion detector to which an interlace signal is sent from the FIFO memory and one-frame-before signal is sent from the second-stage field memory, for determining the difference between the signals to detect the motion level; means for performing interpolation processing for a static image from one-field-before signal and one-field-after signal; means for generating a signal, not sent in the current field, from the upper and lower scan lines to perform interpolation processing for a moving image; and a first 1H delay memory for delaying a coefficient of motion, output from the motion detector, by one line, and the mixing ratio of the signal, which has been interpolated for the static image, to the signal, which has been interpolated for the moving image, is determined based on the coefficient output from the motion detector and the first 1H delay memory.

In the scan line conversion circuit, the means for performing interpolation processing for a static image comprises, for example: a first adder for adding the signal output from the FIFO memory and the signal output from the second-stage field memory together; and a second multiplier for multiplying the signal, output from the first adder, by ½.

Further, in the scan line conversion circuit, the means for performing interpolation processing for a moving image comprises, for example: a second 1H delay memory for delaying the signal, output from the first-stage field memory, by one line; a second adder for adding the signal output from the first-stage field memory and the signal output from the second 1H delay memory together; a third multiplier for multiplying the signal output from the second adder by ½; a third 1H delay memory for delaying the signal, output from the second 1H delay memory, by one line; a third adder for adding the signal output from the second 1H delay memory and the signal output from the third 1H delay memory together; and a fourth multiplier for multiplying the signal output from the third adder by ½.

Further, in the scan line conversion circuit, a construction may be adopted which further comprises: means wherein the output of the second multiplier and the output of the third multiplier are input and the mixing ratio is controlled by the coefficient sent from the motion detector and of which the output is input into the first multiplier; a fourth 1H delay memory for delaying the output of the second multiplier by one line; and means wherein the output of the fourth multiplier and the output of the fourth 1H delay memory are input and the mixing ratio is controlled by the coefficient sent from the first 1H delay memory and of which the output is input into the first multiplier. Only the resolution conversion of the non-interlace signal can be selectively carried out by providing a switch circuit for switching connection in such a manner that the fourth 1H delay memory, the second 1H delay memory, and the third 1H delay memory are connected in that order, the output of the FIFO memory is input into the fourth 1H delay memory, and the output of the third 1H delay memory is input into the first multiplier.

In the invention, unlike the prior art technique wherein the sequential scan conversion circuit is provided separately from the scan line conversion circuit, the three-dimensional motion adaptive sequential scan conversion and the scan line conversion (resolution conversion) can be simultaneously carried out. This can reduce the necessary number of circuits and thus can reduce the size of the whole circuit. Further, in recent years, in many cases, the FIFO memory 2 and the field memories 3, 4 shown in FIG. 4 are constructed using SDRAM. In the prior art technique, as shown in FIG. 9, SDRAM for sequential scan conversion should be provided separately from SDRAM for resolution conversion. On the other hand, in the invention, SDRAM can be made common to sequential scan conversion and resolution conversion. The necessary number of external SDRAMs can be reduced, and, thus, the cost can be reduced.

Further, in the conventional circuit, after three-dimensional motion adaptive sequential scan conversion of an input video signal, the number of scan lines is converted. Therefore, in the course of signal processing, operation should be performed at a higher frequency than the clock rate required for resolution in the display device. On the other hand, in the invention, there is no need to perform conversion to a higher clock rate than that of the display device. This advantageously facilitates the design of LSI.

BRIEF DESCRIPTION OF THE DRAWINGS

The invention will be explained in more detail in conjunction with the appended drawings, wherein.

DESCRIPTION OF THE PREFERRED EMBODIMENTS

Preferred embodiments of the scan line conversion circuit according to the invention will be explained in detail with reference to the accompanying drawings.

Figure 1:
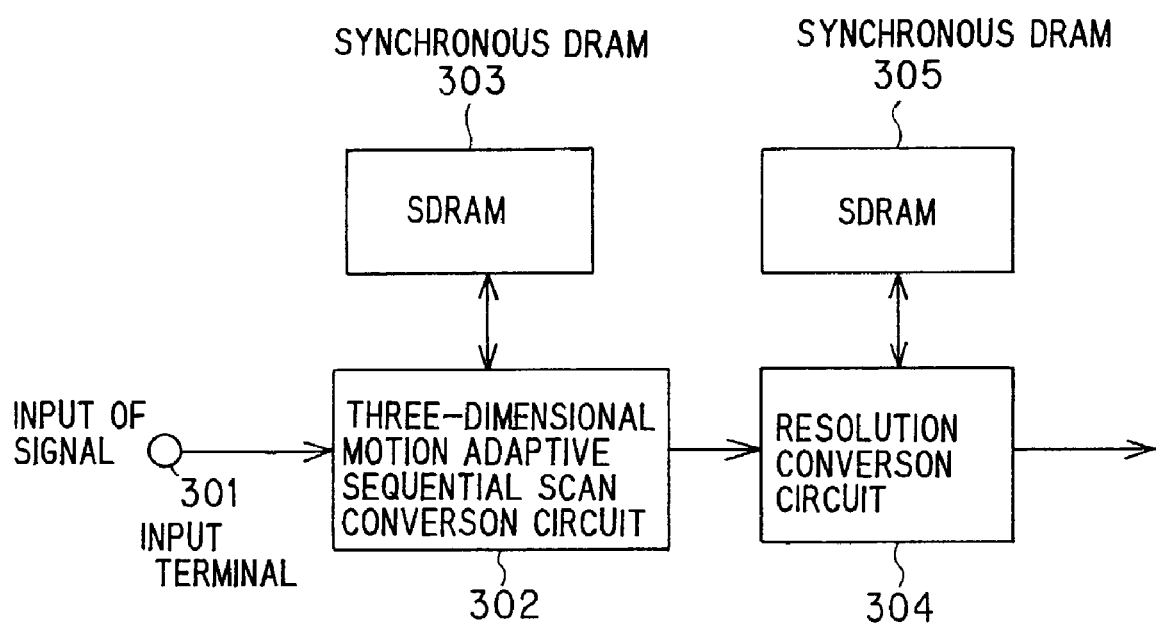
FIG. 1 is a block diagram showing the construction of a conventional system.
Figure 2:
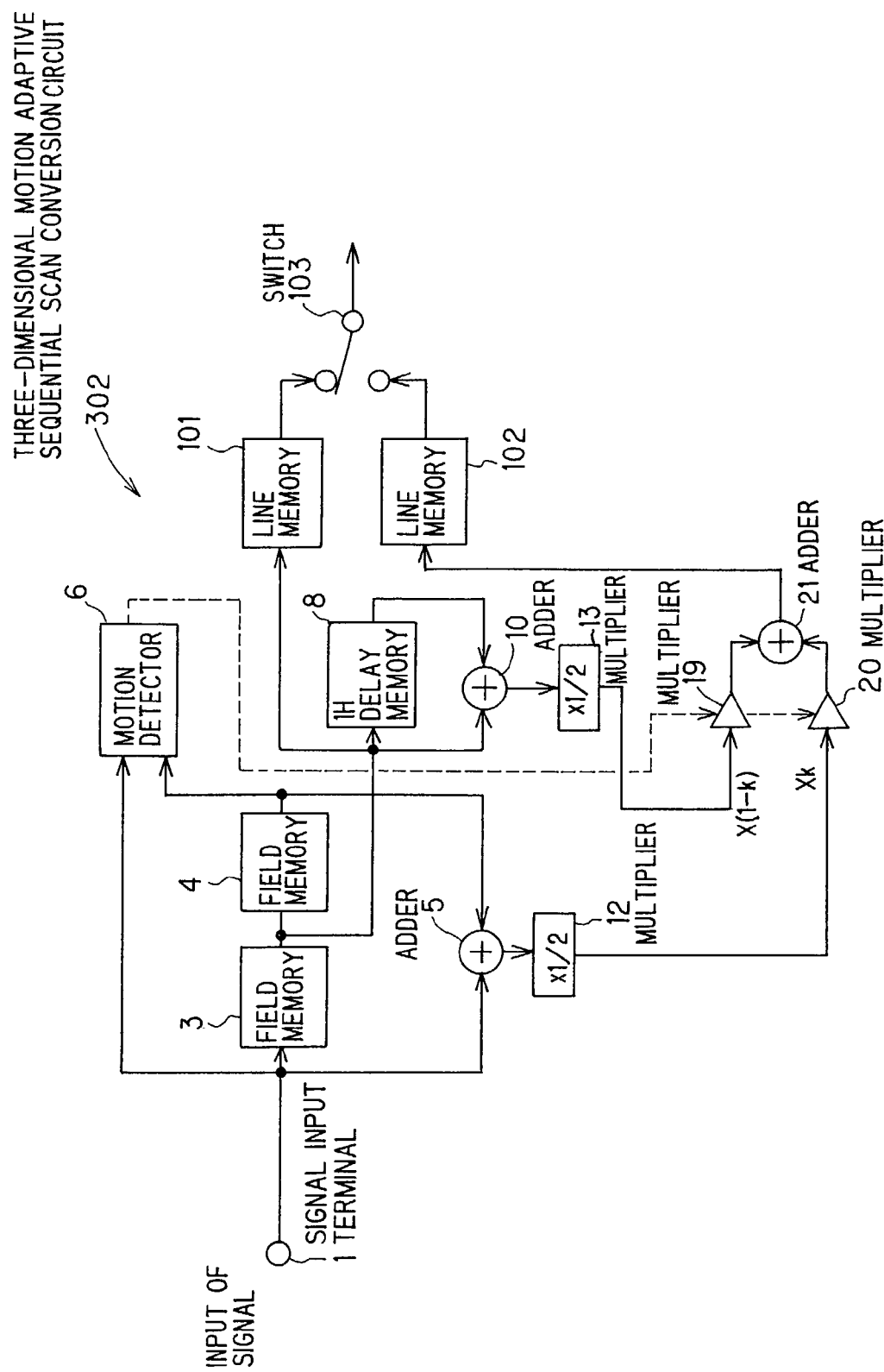
FIG. 2 is a circuit diagram showing a conventional three-dimensional motion adaptive sequential scanning conversion circuit.
Figure 3:
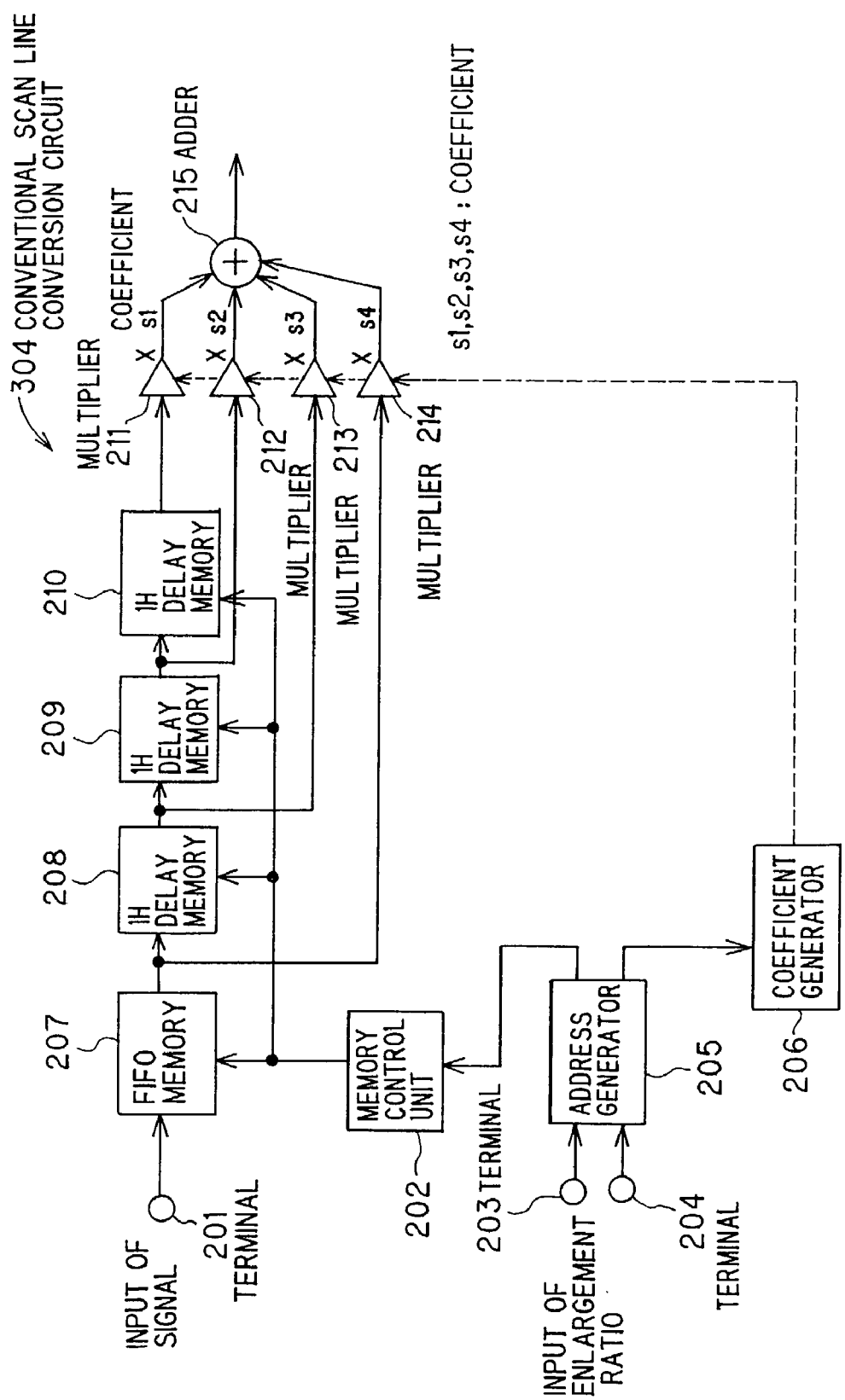
FIG. 3 is a circuit diagram showing a conventional scan line conversion circuit.
Figure 4:
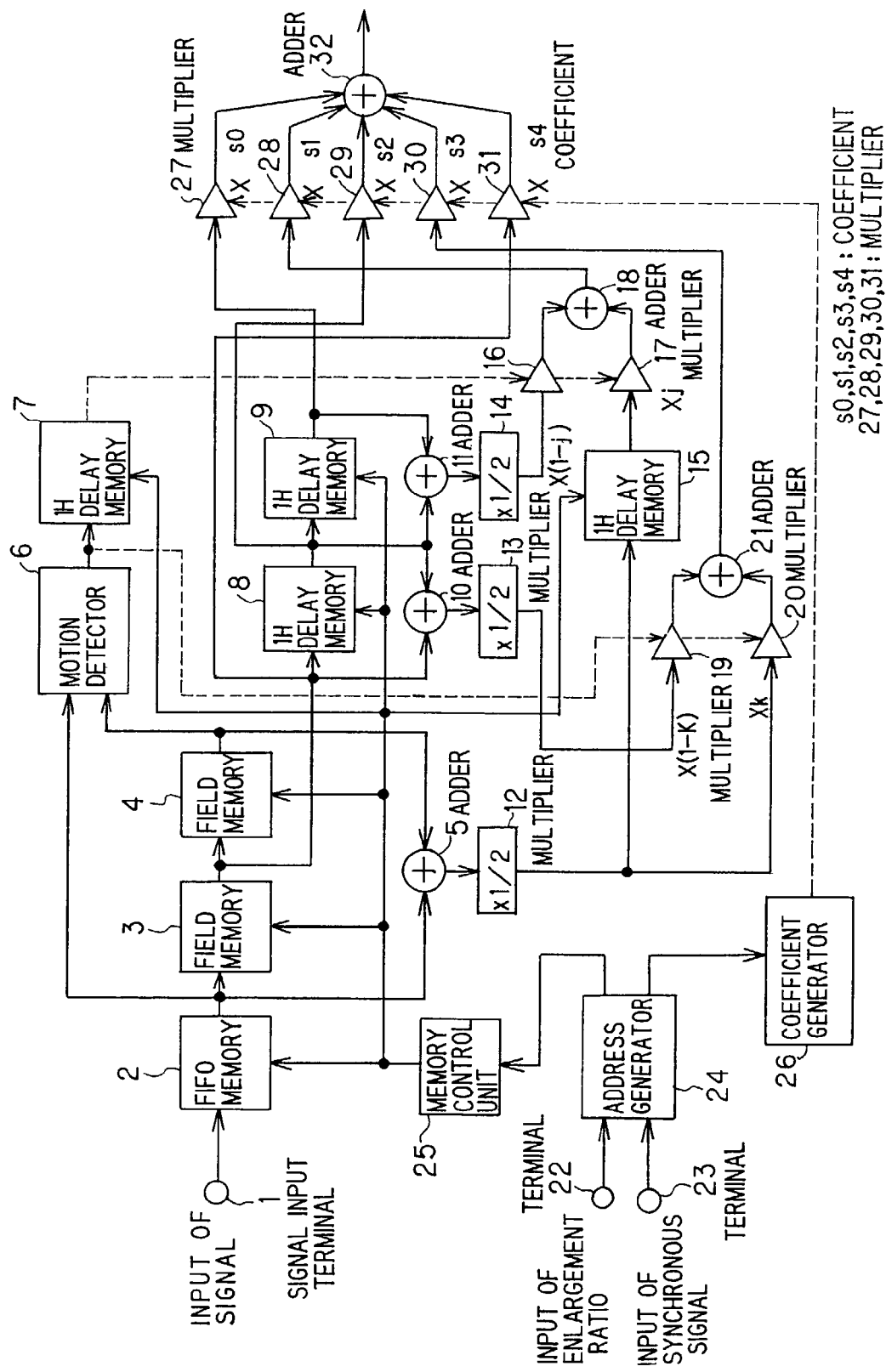
FIG. 4 is a circuit diagram showing a scan line conversion circuit according to a preferred embodiment of the invention.

FIG. 4 shows a scan line conversion circuit according to a preferred embodiment of the invention. According to the scan line conversion circuit of this preferred embodiment, in the conventional three-dimensional motion adaptive sequential scan conversion circuit shown in FIG. 2, for scan line conversion, a FIFO (first in first out) memory 2; an address generator 24 for generating an address; a memory control unit 25 for controlling the memory; a coefficient generator 26 for generating a coefficient from a signal obtained from the address generator 24; multipliers 27 to 31 for sequentially multiplying signals, produced by the scan conversion processing, by the coefficient; and an adder 32 for adding the outputs of the multipliers, are additionally provided.

In the address generator 24, a spatial position after scan line interpolation necessary for scan line conversion, that is, an address, is generated from a synchronous signal of the signal input into a terminal 23 and an enlargement ratio, which is input into a terminal 22 and sets the enlargement ratio in the vertical direction. Based on the address output from the address generator 24, the memory control unit 25 decides a line to be used for resolution conversion. That is, the memory control unit 25 generates a memory control signal for the read/write control of the FIFO memory 2, the field memories 3, 4, and the one-line delay memories 7, 8, 9, 15 so as to send data on the line necessary for resolution conversion to the multipliers 27 to 31 provided in the final stage. Further, in the coefficient generator 26, a coefficient to be sent to the multipliers 27 to 31 is generated based on the signal output from the address generator 24.

Signals equivalent to sequentially scan converted signals are input into the multipliers 27 to 31, and, in the multipliers 27 to 31, the signals are multiplied by the coefficient sent from the coefficient generator 26, and the obtained values are added together in the adder 32, whereby three-dimensional motion adaptive sequential scan line conversion and scan line conversion can be simultaneously carried out.

In the prior art technique, after the three-dimensional motion adaptive sequential scan conversion, scan line conversion for conversion to the number of scan lines according to the display panel was necessary. On the other hand, in the invention, since the three-dimensional motion adaptive sequential scan conversion and the scan line conversion can be simultaneously carried out, the entire circuit scale can be reduced. In addition, when the resolution of the resolution converted signal is lower than the resolution of sequentially scan converted signals, the need to make the maximum operation frequency higher than the frequency of the resolution converted signal can be eliminated and, thus, the design of LSI can be advantageously facilitated.

Next, the scan line conversion circuit according to the preferred embodiment of the invention will be explained in more detail in conjunction with FIG. 4. The scan line conversion circuit has a signal input terminal 1 for inputting an interlace video signal. The interlace signal input into the terminal 1 is sent to the FIFO memory 2 where asynchronous processing is carried out for converting the signal synchronized with the input clock to the signal synchronized with the clock after the scan line conversion. The output of the FIFO memory 2 is sent to the field memory 3, the motion detector 6, and the adder 5. Further, the output of the field memory 3 is input into the next-stage field memory 4.

The signals output from the FIFO memory 2 and the field memory 4 are input into the adder 5, and the signal output from the adder 5 is input into a multiplier 12 for multiplying the signal, output from the adder 5, by ½. In the adder 5 and the multiplier 12, a signal not sent to the current field due to the interlace signal is generated from a signal of one field before the contemplated signal and a signal of one field after the contemplated signal, and interpolation processing, in the case where the input signal is a static image, is performed.

The signal output from the field memory 3 is sent to a 1H delay memory 8, an adder 10, and a multiplier 31, for one-line delaying. The signal output from the 1H delay memory 8 is sent to the 1H delay memory 9, the adders 10, 11, and the multiplier 29, which are provided in tandem. Further, the output of the 1H delay memory 9 is sent to the adder 11 at the other input terminal of the adder 11 and is further sent to the multiplier 27. The output of the adder 10 and the output of the adder 11 are sent respectively to the multipliers 13 and 14 for multiplying these values by ½.

In the adders 10 and 11, in the input interlace signal, the upper scan line is added to the lower scan line. Therefore, a signal not to be sent to the current field is generated from the upper and lower scan lines, and interpolation processing, in the case where the input signal is a moving image, is performed.

On the other hand, in the motion detector 6, the output of the FIFO memory 2 and a signal, which has been delayed by two fields by the field memories 3, 4, that is, a one-frame-before signal, are input, and the motion level is detected by determining the difference between these signals. In the motion detector 6, processing is performed to transform the motion quantity into a coefficient from the motion level. The coefficient output from the motion detector 6 is input into the 1H delay memory 7 for one-line delay. The coefficient output from the motion detector 6 is sent to the multipliers 19, 20, and the coefficient output from the 1H delay memory 7 is sent to the multipliers 16, 17, where the mixing ratio of the signal, which has been interpolated for the static image, to the signal, which has been interpolated for the moving image, is adaptively varied according to the motion quantity of the input signal.

Finally, the sequentially scan converted signals are sent to the multipliers 27, 28, 29, 30, 31, and the outputs of the multipliers 27, 28, 29, 30, 31 are sent to the adder 32. In the multipliers 27, 28, 29, 30, 31, the sequentially scan converted signals are multiplied, respectively, by coefficient values s0, s1, s2, s3, s4 produced in the coefficient generator 26, and the values obtained by the multiplication are added together in the adder 32, whereby the motion adaptive sequential scan line conversion and the scan line conversion can be simultaneously carried out.

The operation of this preferred embodiment will be explained. At the outset, an interlace video signal is input into the signal input terminal 1. The interlace signal input into this input terminal 1 is sent to the FIFO memory 2 where asynchronous processing is carried out for converting the signal, synchronized with the input clock, to a signal synchronized with the clock after the scan line conversion. The output of the FIFO memory 2 is sent to the field memory 3, the motion detector 6, and the adder 5. Further, the output of the field memory 3 is input into the next-stage field memory 4.

The signals output from the FIFO memory 2 and the field memory 4 are input into the adder 5, and the signal output from the adder 5 is input into a multiplier 12 for multiplying the signal, output from the adder 5, by ½. In the adder 5 and the multiplier 12, a signal not sent to the current field due to the interlace signal is generated from a signal of one field before the contemplated signal and a signal of one field after the contemplated signal, and inter-field interpolation processing, in the case where the input signal is a static image, is performed.

The signal output from the field memory 3 is sent to the 1H delay memory 8, the adder 10, and the multiplier 31, for one-line delay. The signal output from the 1H delay memory 8 is sent to the 1H delay memory 9, the adders 10, 11, and the multiplier 29, which are provided in tandem. Further, the output of the 1H delay memory 9 is sent to the adder 11 at the other input terminal of the adder and is sent to the multiplier 27. The output of the adder 10 and the output of the adder 11 are sent, respectively to the multipliers 13 and 14 for multiplying these values by ½.

In the adders 10 and 11, in the input interlace signal, the upper scan line is added to the lower scan line. Therefore, a signal not to sent to the current field is generated from the upper and lower scan lines, and intra-field interpolation processing, in the case where the input signal is a moving image, is performed.

On the other hand, in the motion detector 6, the output of the FIFO memory 2 and a signal, which has been delayed by two fields, that is, a one-frame-before signal, are input, and the motion level is detected by determining the difference between these signals. In the motion detector 6, processing is performed to transform the motion quantity into a coefficient from the motion level. In general, the frame difference value of the 8-bit input signal is output as a coefficient of motion quantity of about 2 bits or 4 bits. The coefficient output from the motion detector 6 is input into the 1H delay memory 7 for one-line delaying. The coefficient output from the motion detector 6 is sent to the multipliers 19, 20, and the coefficient output from the 1H delay memory 7 is sent to the multipliers 16, 17, where the mixing ratio of the inter-field interpolation signal generated for the static image to the intra-field signal generated for the moving image is adaptively varied according to the motion quantity of the input signal. Coefficients j, k sent to the multipliers 17 and 20 for processing the signal obtained by the inter-frame interpolation are closer to 1 when the motion quantity is smaller.

Finally, signals equivalent to the sequentially scan converted signals are sent to the multipliers 27, 28, 29, 30, 31 and are multiplied, respectively, by coefficient values s0, s1, s2, s3, s4 generated in the coefficient generator 26, and the values obtained by the multiplication are added together in the adder 32, whereby the motion adaptive sequential scan line conversion and the scan line conversion can be simultaneously carried out.

Figure 5:
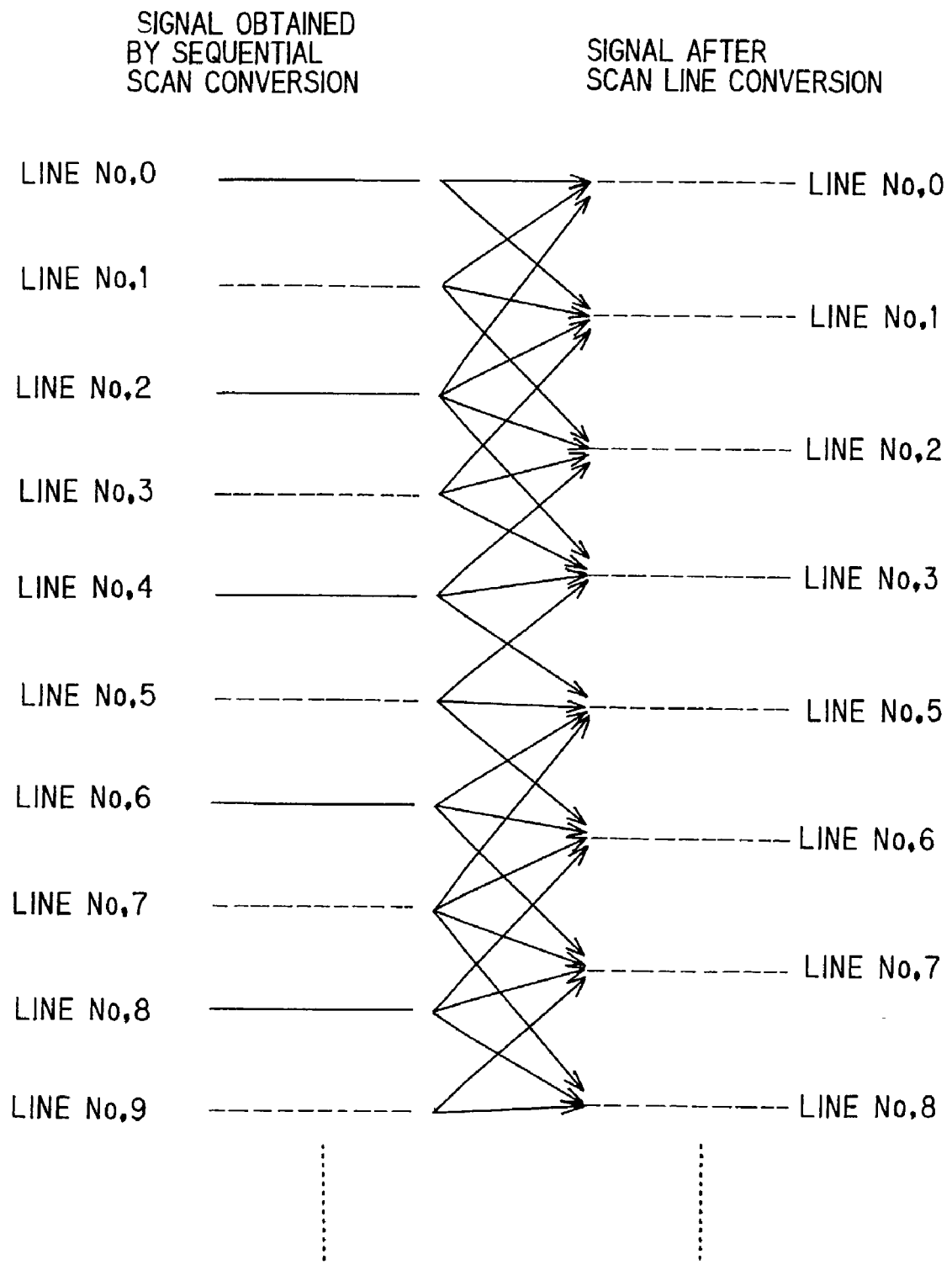
FIG. 5 is a typical diagram showing a spatial position of scan line conversion according to a preferred embodiment of the invention.

Next, the operation of the address generator 24 shown in FIG. 4 will be explained in conjunction with FIG. 5 showing spatial position in the scan line conversion. In the preferred embodiment, an explanation will be given where an interlace-input video signal of 1080 lines is converted to a non-interlace signal of 864 lines, as an example. A synchronous signal and an enlargement ratio are input into the address generator 24.

Since the number of lines is 1080 for the input signal and 864 for the output signal, a reduction to 864/1080 is carried out. The reciprocal of 864/1080 is 1.25, and this value is input into the enlargement ratio input section 22 shown in FIG. 4.

The value 1.25 corresponds to the spatial distance of the output signal when the spatial distance between lines of the input video signal is 1.

The address generator 24 performs processing so that the value 1.25 is added at the timing of the horizontal synchronous signal on the output side as the occasion demands. In this case, upon the input of the vertical synchronous signal, the value to be added, as the occasion demands, is cleared to zero. Accordingly, in the address generator 24, every time when the output-side horizontal synchronous signal is input, values of 0.00, 1.25, 2.50, 3.75, 5.00, 6.25, 7.50, 8.75, 10.00, 11.25, 12.50, ... are generated.

The integral part of this value is sent to the memory control unit 25, and the decimal part is sent to the coefficient generator 26. Based on the values 0, 1, 2, 3, 4, 5, 6, 7, 8, 9, 10, 11, 12, ..., the memory control unit 25 decides the line of the input signal to be used for resolution conversion, and performs read/write control of the memory so that data on the line necessary for resolution conversion are sent to the final-stage multipliers. In this preferred embodiment, when resolution conversion is carried out using two lines of the input signal, line 0 (zero) after resolution conversion: 0th line and 1st line are used;

line 1 after resolution conversion: 1st line and 2nd line are used;

line 2 after resolution conversion: 2nd line and 3rd line are used;

line 3 after resolution conversion: 3rd line and 4th line are used;

line 5 after resolution conversion: 5th line and 6th line are used; and line 6 after resolution conversion: 6th line and 7th line are used. That is, resolution conversion using the 4th line and the 5th line is not performed.

When resolution conversion is carried out using four lines of the input signal, line 0 (zero) after resolution conversion: −1st line, 0th line, 1st line, and 2nd line are used;

line 1 after resolution conversion: 0th line, 1st line, 2nd line, and 3rd line are used;

line 2 after resolution conversion: 1st line, 2nd line, 3rd line, and 4th line are used;

line 3 after resolution conversion: 2nd line, 3rd line, 4th line, and 5th line are used;

line 5 after resolution conversion: 4th line, 5th line, 6th line, and 7th line are used; and line 6 after resolution conversion: 5th line, 6th line, 7th line, and 8th line are used.

In this case, since −1st line is not present, as shown in FIG. 5, in line 0 in the signal after scan line conversion, interpolation is carried out by three lines. Thus, the integral part of the value generated in the address generator 24 represents the line of the input signal to be used. Specifically, based on the integral part of the value output from the address generator 24, the line to be used is determined independently of the weighting when the enlargement ratio is determined.

On the other hand, the decimal part is sent to the coefficient generator 26. The decimal part of the obtained value represents the spatial distance between the input signal and the signal produced by the scan line conversion. In the coefficient generator 26, coefficients s0, s1, s2, s3, s4 are produced for deciding the weight of the multiplication according to the spatial distance.

Figure 6:
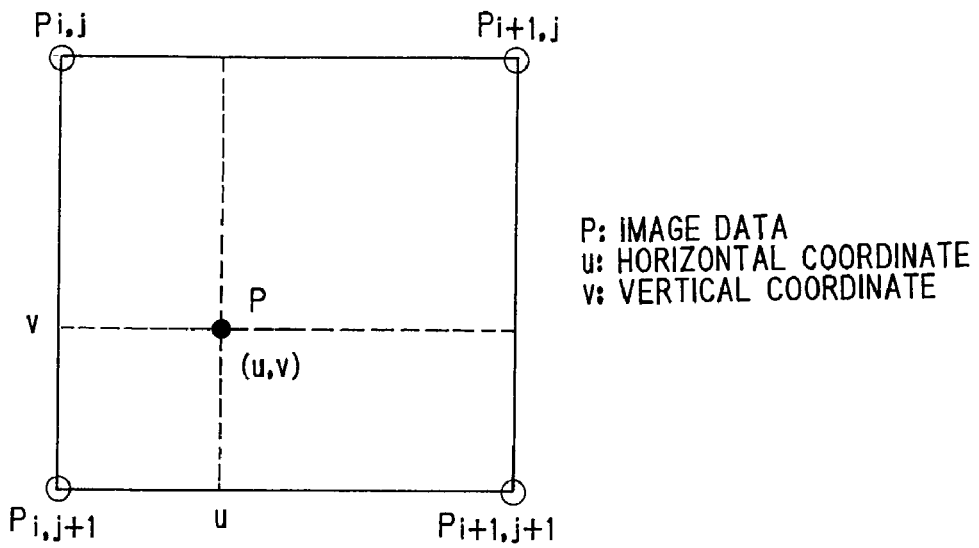
FIG. 6 is a typical diagram showing resolution conversion using two lines.

At the outset, resolution conversion using two lines of the input signal will be explained. FIG. 6 is a typical diagram showing resolution conversion using two lines. As shown in FIG. 6, in order to determine image data P (u, v) represented by ●, the resolution conversion using two lines (four image data) is represented by equation (1). In equation (1), u represents a horizontal coordinate, and v a vertical coordinate. In this case, horizontal resolution conversion is not described. Therefore, u in equation (1) is neglected, and the decimal part corresponds to (v−j).

$$P=\{(i+1)-u\}\{(j+1)-v\}Pi, \quad j+\{(i+1)-u\}\{v-j\}Pi,$$
$$j+1+\{u-i\}\{(j+1)-v\}Pi+1,j+\{u-i\}\{v-j\}Pi+1,j+1 \quad (1)$$

Figure 7:
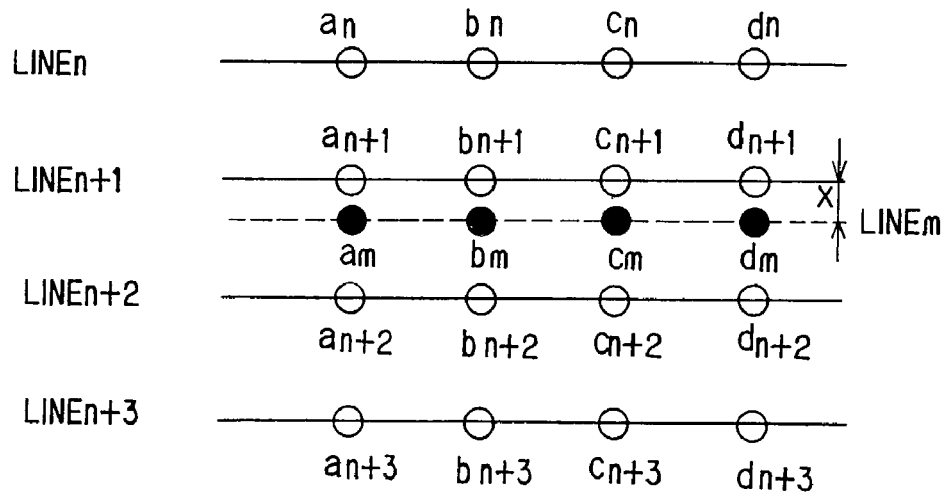
FIG. 7 is a typical diagram illustrating a method for calculating a coefficient generated in a coefficient generator.

FIG. 7 is a typical diagram illustrating a method for calculating the coefficient generated in the coefficient generator 26. In FIG. 7, the spacings of lines n, n+1, n+2, and n+3 are 1, and the distance between line n+1 and line m is x. am to dm represent output pixel values, and an to dn, an+1 to dn+1, an+2 to dn+2, and an+3 to dn+3 input pixel values. The pixel am is generated from an+1 and an+2, and, based on equation 1, am is represented by equation (2).

$$am = x \times an+2 + (1-x) \times an+1 \quad (2)$$

As is apparent from equation 2, when x is smaller, am is closer to an +1. Therefore, a +1 is more important. The pixels bm to dm can be determined in the same manner as used in the determination of am.

Figure 8:
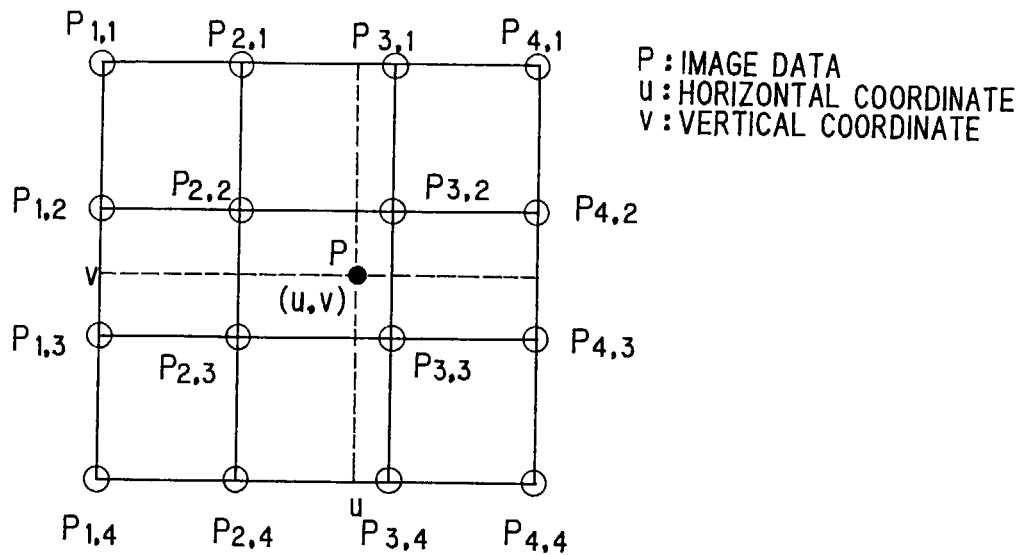
FIG. 8 is a typical diagram showing resolution conversion using four lines.

Next, resolution conversion using four lines of the input signal will be explained. FIG. 8 is a typical diagram showing resolution conversion using four lines. As shown in FIG. 8, in order to determine image data P(u, v) 0represented by ●, resolution conversion using four lines (16 image data) is determined by equations (3) and (4).

$$P = [f(y_1)f(y_2)f(y_3)f(y_4)] \begin{bmatrix} P_{1,1} & P_{2,1} & P_{3,1} & P_{4,1} \\ P_{1,2} & P_{2,2} & P_{3,2} & P_{4,2} \\ P_{1,3} & P_{2,3} & P_{3,3} & P_{4,3} \\ P_{1,4} & P_{2,4} & P_{3,4} & P_{4,4} \end{bmatrix} \begin{bmatrix} f(X_1) \\ f(X_2) \\ f(X_3) \\ f(X_4) \end{bmatrix} \quad (3)$$

$$f(t) = \frac{\sin \pi t}{\pi t} \approx \begin{cases} 1 - 2|t|^2 + |t|^3 & (0 \le |t| < 1) \\ 4 - 8|t| + 5|t|^2 - |t|^3 & (1 \le |t| < 2) \\ 0 & (2 \le |t|) \end{cases} \quad (4)$$

When the pixel am is determined from four lines, the pixel am is generated from an, an+1, an+2, and an+3, and, based on equations (3) and (4), am is represented by equation (5). In this case, the distance between an and am is 1+x, the distance between an+1 and am is x, the distance between an+2 and am is 1−x, and the distance between an+3 and am is 1+(1−x)=2−x.

$$am = an \times \{4-8(1+x)+5(1+x)2-(1+x)3\}+an+1\times\{1-2x2+x3\}+an+2\times\{1-2(1-x)2+(1-x)3\}+an+3\times\{4-8(2-x)+5(2-x)2-(2-x)3\} \quad (5)$$

Figure 9:
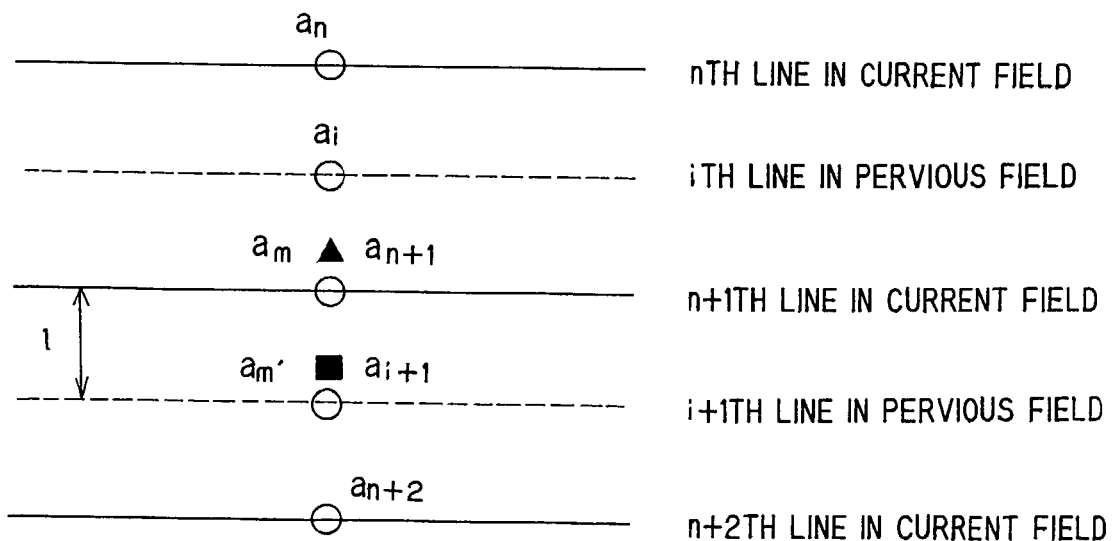
FIG. 9 is a typical diagram illustrating resolution conversion of an interlace signal.

Next, handling of the interlace signal using four lines will be explained. FIG. 9 is a typical diagram illustrating resolution conversion of the interlace signal. In FIG. 9, the spacing between the lines is 1. In this case, in the same manner as used in the four-line method, the pixels am and am' are given by equations (6) and (7).

$$am = s0 \times an + s1 \times a1 + s2 \times an+1 + s3 \times a1+1 + s4 \times an+2 \quad (6)$$

$$am' = s0 \times an + s1 \times a1 + s2 \times an+1 + s3 \times a1+1 + s4 \times an+2 \quad (7)$$

In equation (6), the coefficient s4, by which an+2 is multiplied, is 0 from equation (4), and, in equation (7), the coefficient s0, by which an is multiplied, is 0 from equation (4).

Equation (8) is used, when a coefficient, which is larger when the distance to the signal after the scan line conversion is smaller, is generated, or as an extended equation of equation (4). Equation (8) is an approximate equation of Sin(x)/x.

$$f(t) = \frac{\sin \pi t}{\pi t} \approx \begin{cases} 1 - (a+3)|t|^2 + (a+2)|t|^3 & (0 \le |t| < 1) \\ -4a + 8a|t| - 5a|t|^2 + a|t|^3 & (1 \le |t| < 2) \\ 0 & (2 \le |t|) \end{cases} \quad (8)$$

In equation (8), the value of a is approximately $-1 \leqq a < -2$. In this case, when the value of a is −1, the equation is the same as equation (4). From equation (8), as shown in equations (9) to (12), coefficients Ka to Kd are determined.

$$Ka = a(1+x)3 - 5a(1+x)2 + 8a(1+x) - 4a \quad (9)$$

$$Kb = (a+2) \times 3 - (a+3) \times 2 + 1 \quad (10)$$

$$Kc = (a+2)(1-x)3 - (a+3)(1-x)2 + 1 \quad (11)$$

$$Kd = a(2-x)3 - 5a(2-x)2 + 8a(2-x) - 4a \quad (12)$$

x is the spatial distance between the signal produced by the scan line conversion and the input signal, that is, a value produced by the decimal part output from the address generator, and x in equations 9 to 12 corresponds to the decimal part. In FIG. 9, when am is determined, Ka=s0, Kb=s1, Kc=s2, Kd=s3, and s4=0. In the case of am', s0=0, Ka=s1, Kb=s2, Kc=s3, and Kd=s4.

Thus, when the position is just under the interlace signal for which the spatial position after the scan line conversion has been input, since computing is performed using the multipliers 28, 29, 30, 31, the value of s0 of the multiplier 27 is zero. When the position is just under the interlace signal for which the spatial position after the scan line conversion has not been input, since computing is performed using the multipliers 27, 28, 29, 30, the value of s4 of the multiplier 31 is zero.

In this preferred embodiment, since high-performance resolution conversion is contemplated, the determination of the output signal using four lines of the input signal has been explained. Specifically, a method has been explained wherein, for the signal input into the adder 32 shown in FIG. 4, one pixel is multiplied by the coefficient 0, and values obtained by multiplying four other pixels by coefficients are added thereto to perform four-line interpolation. However, a construction is also possible wherein interpolation is performed from signals of two lines located at spatial distances over and under the pixel produced by the scan line conversion. The resolution conversion can also be carried out in the case where, as shown in equation (2), two lines of the input signal are used.

Figure 10:
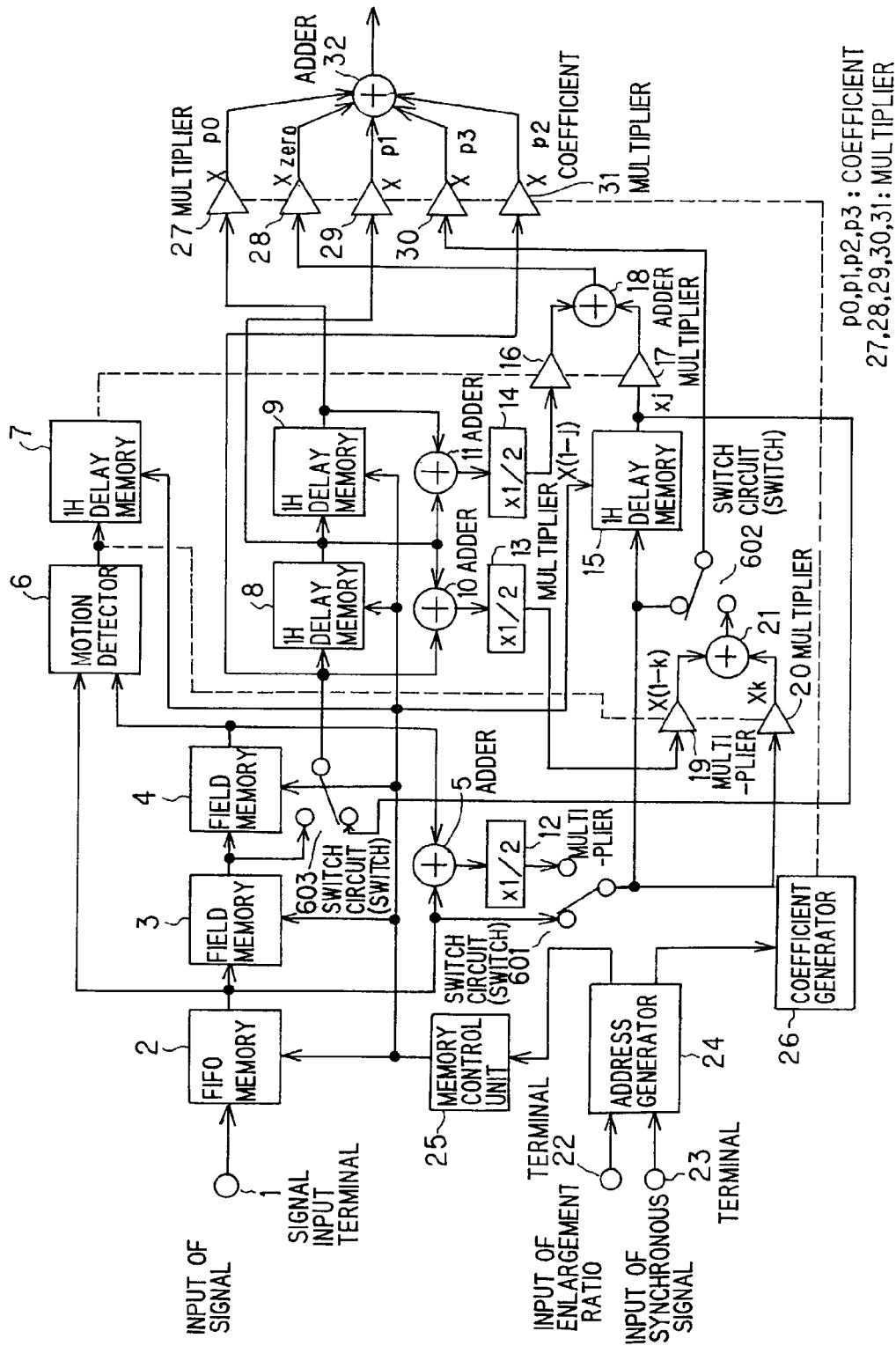
FIG. 10 is a circuit diagram showing a scan line conversion circuit according to another preferred embodiment of the invention.

Next, another preferred embodiment of the invention will be explained. FIG. 10 is a circuit diagram showing a scan line conversion circuit according to another preferred embodiment of the invention. In FIGS. 4 to 10, like parts are identified with the same reference numerals, and the overlapped explanation will be omitted.

In this another preferred embodiment of the invention, the case, where a non-interlace signal is input and only scan line conversion is carried out without sequential scan conversion, can be switched to the case where an interlace signal is input and scan line conversion is carried out while performing three-dimensional motion adaptive sequential scan conversion, and vice versa. This preferred embodiment is the same as the preferred embodiment shown in FIG. 4, except that switch circuits (switches) 601, 602, 603 are additionally provided.

In this preferred embodiment, when the status of switching in the switch circuits 601, 602, 603 is as shown in FIG. 10, the adder 5 and the multiplier 12 are bypassed, and the multipliers 19, 20 and the adder 21 are bypassed. In addition, the output of the 1H delay memory 15 rather than the output of the field memory 3 is input into the multiplier 31 and the adder 10. According to this, connection is switched so that the 1H delay memory 15, the 1H delay memory 8, and the 1H delay memory 9 are connected in that order, the output of the FIFO memory 2 is input into the 1H delay memory 15, and the output of the 1H delay memory 9 is input into the multiplier 27. In this case, coefficients output from the coefficient generator 26 are 0 (zero) and p0, p1, p2, and p3, and the coefficient 0 is given to the multiplier 28, while the coefficients p0, p1, p2, and p3 are given respectively to the multipliers 27, 29, 30, 31.

In the scan line conversion circuit having the above construction, when a non-interlace signal is input into the signal input terminal 1, the switch circuits 601, 602, 603 are switched as shown in FIG. 10. In this case, since sequential scan conversion is not required of the input non-interlace signal, only scan line conversion is carried out without the sequential scan conversion. On the other hand, when the switch circuits 601, 602, 603 are switched in a form opposite to that shown in FIG. 10, the circuit is the same as the circuit shown in FIG. 4, and, in this case, interlace signal processing is possible. Therefore, in this preferred embodiment, both the case, where a non-interlace signal is input and only scan line conversion is carried out without sequential scan conversion, and the case, where an interlace signal is input and scan line conversion is carried out while performing three-dimensional motion adaptive sequential scan conversion, can be realize by additionally providing a few circuits (switch circuits 601, 602, 603) in the circuit shown in FIG. 4.

As is apparent from the foregoing detailed description, according to the invention, unlike the prior art technique wherein the sequential scan conversion circuit is provided separately from the scan line conversion circuit, the sequential scan conversion and the scan line conversion can be simultaneously carried out. This can realize a reduction in circuit scale.

Further, in recent years, in many cases, the FIFO memory and the field memory are constructed using SDRAM. In the invention, SDRAM can be made common to sequential scan conversion and resolution conversion. This can reduce the necessary number of external SDRAMs, and thus, the cost can be reduced.

In the prior art technique, when an HDTV signal is input into a display device wherein the number of scan lines is, for example, 768, a method should be used wherein, after a digital HDTV signal input at a clock rate of 74.25 MHz is converted by three-dimensional motion adaptive sequential scan conversion to a signal of the number of scan lines 1080 and clock rate 148.5 MHz, the number of scan lines is converted to 768. In this case, in the course of signal processing, operation should be performed at a higher frequency than the clock rate required for resolution in the display device. On the other hand, in the present invention, there is no need to perform conversion to a higher clock rate than that of the display device. This advantageously facilitates the design of LSI.

The invention has been described in detail with particular reference to preferred embodiments, but it will be understood that variations and modifications can be effected within the scope of the invention as set forth in the appended claims.

What is claimed is:

1. A scan line conversion circuit for converting the number of scan lines of an input video signal, said scan line conversion circuit comprising:
   a FIFO (first in first out) memory into which the video signal is input;
   a sequential scan conversion circuit section for converting an interlace signal sent from the FIFO memo to non-interlace signal, the sequential scan conversion circuit section including a field memory;
   an address generator into which a vertical enlargement ratio and a synchronous signal are input to generate an address as a spatial position after scan line conversion;
   a memory control unit for generating a memory control signal based on the address sent from the address generator;
   a coefficient generator for generating a coefficient for performing scan line conversion;
   a plurality of first multipliers for multiplying sequentially scan converted signals, sent from the sequential scan conversion circuit section, by respective coefficients; and
   an adder for adding signals output from the multipliers together,
   wherein the memory control unit controls memories including the FIFO memory and the field memory in the sequential scan conversion circuit section and inputs line data necessary for resolution conversion into the multipliers.

2. The scan line conversion circuit according to claim 1, wherein the means for performing interpolation processing for a moving image comprises: a second 1H delay memory for delaying the signal, output from the first-stage field memory, by one line; a second adder for adding the signal output from the first-stage field memory and the signal output from the second 1H delay memory together; a third multiplier for multiplying the signal output from the second adder by ½; a third 1H delay memory for delaying the signal, output from the second 1H delay memory, by one line; a third adder for adding the signal output from the second 1H delay memory and the signal output from the third 1H delay memory together; and a fourth multiplier for multiplying the signal output from the third adder by ½.

3. The scan line conversion circuit according to claim 1, wherein
   the sequential scan conversion circuit section comprises: a two-stage field memory to which an interlace signal is sent from the FIFO memory; a motion detector to which an interlace signal is sent from the FIFO memory and one-frame-before signal is sent from the second-stage field memory, for determining the difference between the signals to detect the motion level; means for performing interpolation processing for a static image from one-field-before signal and one-field-after signal; means for generating a signal, not sent in the current field, from the upper and lower scan lines to perform interpolation processing for a moving image; and a first 1H delay memory for delaying a coefficient of motion, output from the motion detector, by one line, and
   the mixing ratio of the signal, which has been interpolated for the static image, to the signal, which has been interpolated for the moving image, is determined based on the coefficient output from the motion detector and the first 1H delay memory.

4. The scan line conversion circuit according to claim 3, wherein the means for performing interpolation processing for a static image comprises: a first adder for adding the signal output from the FIFO memory and the signal output from the second-stage field memory together; and a second multiplier for multiplying the signal, output from the first adder, by ½.

5. The scan line conversion circuit according to claim 4, which further comprises: means wherein the output of the second multiplier and the output of the third multiplier are input and the mixing ratio is controlled by the coefficient sent from the motion detector and of which the output is input into the first multiplier; a fourth 1H delay memory for delaying the output of the second multiplier by one line; and means wherein the output of the fourth multiplier and the output of the fourth 1H delay memory are input and the mixing ratio is controlled by the coefficient sent from the first 1H delay memory and of which the output is input into the first multiplier.

6. The scan line conversion circuit according to claim 5, which further comprises a switch circuit for switching connection in such a manner that the fourth 1H delay memory, the second 1H delay memory, and the third 1H delay memory are connected in that order, the output of the FIFO memory is input into the fourth 1H delay memory, and the output of the third 1H delay memory is input into the first multiplier.

* * * * *

UNITED STATES PATENT AND TRADEMARK OFFICE
CERTIFICATE OF CORRECTION

| | | |
|---|---|---|
| PATENT NO. | : 7,006,148 B2 | Page 1 of 1 |
| APPLICATION NO. | : 10/179216 | |
| DATED | : March 12, 2007 | |
| INVENTOR(S) | : Hiroshi Nagata | |

It is certified that error appears in the above-identified patent and that said Letters Patent is hereby corrected as shown below:

Column 13, line 46 through column 14, line 4, delete claim 2 in its entirety;

Column 14, line 5, delete "3." and insert --2.--;

Column 14, line 27, delete "4." and insert --3.--;

Column 14, line 27, delete "claim 3," and insert --claim 2,--;

Column 14, after line 33 and before line 34, insert -- 4. The scan line conversion circuit according to claim 3, wherein the means for performing interpolation processing for a moving image comprises: a second 1H delay memory for delaying the signal, output from the first-stage field memory, by one line; a second adder for adding the signal output from the first-stage field memory and the signal output from the second 1H delay memory together; a third multiplier for multiplying the signal output from the second adder by 1/2; a third 1H delay memory for delaying the signal, output from the second 1H delay memory, by one line; a third adder for adding the signal output from the second 1H delay memory and the signal output from the third 1H delay memory together; and a fourth multiplier for multiplying the signal output from the third adder by 1/2.--

Signed and Sealed this

Fifteenth Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 7,006,148 B2  Page 1 of 1
APPLICATION NO. : 10/179216
DATED : February 28, 2006
INVENTOR(S) : Hiroshi Nagata It is certified that error appears in the above-identified patent and that said Letters Patent is hereby corrected as shown below:

Column 13, line 46 through column 14, line 4, delete claim 2 in its entirety;

Column 14, line 5, delete "3." and insert --2.--;

Column 14, line 27, delete "4." and insert --3.--;

Column 14, line 27, delete "claim 3," and insert --claim 2,--;

Column 14, after line 33 and before line 34, insert -- 4. The scan line conversion circuit according to claim 3, wherein the means for performing interpolation processing for a moving image comprises: a second 1H delay memory for delaying the signal, output from the first-stage field memory, by one line; a second adder for adding the signal output from the first-stage field memory and the signal output from the second 1H delay memory together; a third multiplier for multiplying the signal output from the second adder by 1/2; a third 1H delay memory for delaying the signal, output from the second 1H delay memory, by one line; a third adder for adding the signal output from the second 1H delay memory and the signal output from the third 1H delay memory together; and a fourth multiplier for multiplying the signal output from the third adder by 1/2.--

This certificate supersedes Certificate of Correction issued May 15, 2007.

Signed and Sealed this

Fifth Day of June, 2007

JON W. DUDAS
*Director of the United States Patent and Trademark Office*